United States Patent Office 2,695,286
Patented Nov. 23, 1954

2,695,286

COMPOUNDS CONTAINING HALOGENS LINKED TO SULFUR

Frederick E. Dearborn, Washington, D. C.

No Drawing. Application June 26, 1951,
Serial No. 233,678

12 Claims. (Cl. 260—239.5)

(Granted under Title 35, U. S. Code (1952), sec. 266)

The invention herein described may be manufactured and used by or for the Government of the United States of America for governmental purposes throughout the world, without the payment to me of any royalty thereon.

The invention relates to organic compounds containing halogens linked to sulfur and has among its objects the provision of such compounds and processes of preparing them. Other objects will be apparent from the description of the invention.

In Patent No. 2,169,793, No. 2,237,096, No. 2,333,093, and No. 2,427,717, I have shown that unsaturated fatty acids of the series $C_nH_{2n-2}O_2$, $C_nH_{2n-4}O_2$, $C_nH_{2n-6}O_2$, the unsaturated hydroxy fatty acids such as ricinoleic, other unsaturated fatty acids such as palmitoleic, the unsaturated fatty acid monohydric esters, and the unsaturated fatty acid glycerides may be made to combine with sulfur under suitable conditions to saturate the double bond or double bonds in their respective molecules to form a thiirane group or groups. Each thiirane group may be defined as the linkage of two adjacent carbon atoms to each other and to a sulfur atom and may be represented by the formula

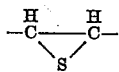

I have also shown in application bearing Serial No. 233,675, filed June 26, 1951, and entitled "Sulfurized Sterols," and in application bearing Serial No. 233,676, filed June 26, 1951, and entitled "Synthetic Sterol Esters Containing Sulfur," that unsaturated sterols as well as their esters add sulfur to the double bond or bonds in a like manner.

Furthermore, in application bearing Serial No. 233,677, filed June 26, 1951, and entitled "Esters of Glycols and Sulfurized Fatty Acids," I have shown that synthetic glycol esters can be prepared from the sulfurized fatty acids.

In the sulfurization process, the sulfur is added to the double bond or bonds to form the thiirane group, the sulfur in the double bond having a valence of two. Since sulfur may have the valence of two, four, or six, it may be presumed that the sulfur is unsaturated in respect to other elements, such as the halogens, which readily react with it.

I have found that 2 or 4 halogen atoms can be linked to the sulfur in the thiirane group (sulfurized double bond) to form various type linkages depending on the valences satisfied. These types are hereinafter referred to as "halothiirane" groups. The various types formed may be illustrated as follows:

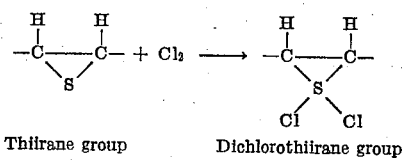

Thiirane group    Dichlorothiirane group

In the resulting dichlorothiirane group, the sulfur has a valence of four. When more chlorine is added the tetrachlorothiirane group is produced wherein the sulfur has a valence of six. This linkage may be represented by the following formula:

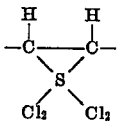

I have found also that different halogens can be added to the sulfur in the thiirane group. This type of linkage may be represented as follows:

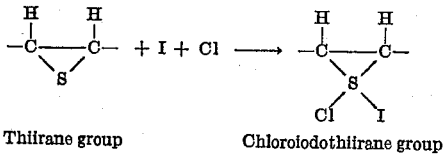

Thiirane group    Chloroiodothiirane group

When more chlorine and iodine are employed, the dichlorodiiodothiirane group, represented below, is formed

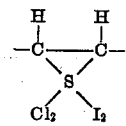

The addition of halogens to the thiirane group or groups includes not only the use of the halogens themselves but also halogen-releasing compounds such as ICl, IBr, BrCl, and so forth. This addition may be represented as follows:

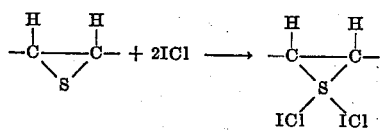

In compounds containing more than one thiirane group in the molecule, the double bond which adds sulfur first during sulfurization is the first to add the halogens, followed by the next more reactive thiirane group. It may be possible to add halogens to a third thiirane group, but the addition is much slower than for the most reactive thiirane group. The halogens add more easily to the sulfurized fatty acids and to the mono- and di-hydric esters of the sulfurized fatty acids than to the sulfurized fatty acid glycerides.

The componds of the invention have a wide variety of uses. Compounds containing the mixed halogens combined with the sulfur in the halothiirane group will have different properties from those containing only one halogen. The various compounds are suitable for use in cosmetic, drug, and phamaceutical preparations and possess germicidal and fungicidal properties to a high degree. Sulfur-halogen compounds, especially the sulfur-iodine compound, have been used as antiseptics in treating chronic skin diseases and in ointments for treating eczema, psoriasis, and parasitic skin diseases (see Merck Index, 1940, page 540). The sulfur-halogen fatty acids readily form alkali and ethanolamine soaps which are suitable for use as medicated soaps and shampoos. Since the compounds possess marked germicidal and fungicidal properties, a triethanolamine soap shampoo is ideal for controlling scalp ringworm, dandruff, and other scalp ailments when used in conjunction with a hair tonic cotnaining the sulfur-halogen fatty acid esters or their glycerides. These soaps, acids, esters and glycerides may be used in insecticidal and fungicidal sprays. The sulfurized-halogenated sterols and their esters are adapted for preparing medicated cosmetics, drugs, and pharmaceutical preparations, e. g., sulfurized-iodized cholesterol and its esters possess very high germicidal and fungicidal properties and induce rapid healing when applied to cuts and abrasions of the skin.

The sulfurized-halogenated fatty acids are useful in controlling tropical fungus infection on the skin as well as "athletes' foot." The monohydric and glycol esters are suitable for making hair tonics, for controlling scalp ringworm, dandruff, and other fungus infections as well as treating leather goods for controlling fungus growth in humid climates by rendering the leather water-repellent, soft and pliable.

According to the instant invention, an organic, and particularly aliphatic, compound having the thiirane grouping

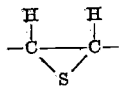

and which includes the sulfurized fatty acids, particularly the aliphatic monocarboxylic higher fatty acids, the sulfurized esters, particularly the esters of aliphatic monocarboxylic higher fatty acids and alkanols, especially the lower alkanols, the sulfurized glycerides, the sulfurized sterols, the sulfurized sterol esters, particularly the esters of sterols and organic monocarboxylic acids, these latter acids including the aliphatic monocarboxylic higher fatty acids, both saturated and unsaturated, as well as the unsaturated hydroxy higher fatty acids such as ricinoleic acid, and including also aromatic monocarboxylic acids such as benzoic acid and phenolic acids such as salicylic acid, and the sulfurized glycol esters disclosed in the patents and patent applications referred to previously, is reacted with a halogen, which includes halogen-releasing compounds such as ICl, IBr, BrCl, and so forth, at a temperature ranging from about room temperature to about 100° C. with suitable agitation, whereupon halogen links to the sulfur of the thiirane grouping to form a halothiirane group.

The types of linkages resulting from the reaction may be represented by the formula

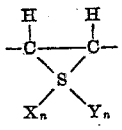

wherein X and Y represent the same or different halogens and $n$ is the numeral one or two, and by the formula

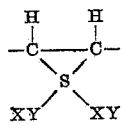

wherein X and Y represent different halogens.

In carrying out the above process, the organic compound containing the thiirane grouping which is used as the starting material, is prepared in accordance with the processes disclosed in the aforementioned patents and patent applications.

In the following illustrative examples of the invention, Examples 1 to 6, inclusive, show the preparation of halogen compounds of sulfurized fatty acids; Examples 7 to 10, inclusive, illustrate the preparation of halogen compounds of monohydric esters of sulfurized fatty acids; Examples 11 to 14, inclusive, demonstrate the preparation of halogen compounds of glycol esters of sulfurized fatty acids; Examples 15 to 17, inclusive, illustrate the preparation of halogen compounds of sulfurized fatty acid glycerides; Examples 18 to 20, inclusive, show the preparation of halogen compounds of sulfurized sterols; and Examples 21 to 23, inclusive, illustrate the preparation of halogen compounds of sulfurized sterol esters.

EXAMPLE 1

*9,10-diiodothiirane octadecanoic acid*

This compound, having the formula

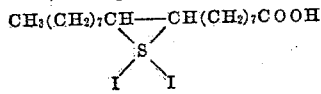

is prepared by reacting sulfurized oleic acid (9,10-thiiraneoctadecanoic acid) with the required amount of finely ground iodine at a temperature ranging from 50° C. to 100° C. with suitable agitation, until the iodine has chemically combined with the sulfur in the thiirane group as shown by test. For every molecule of sulfurized oleic acid used, two atomic weights of iodine are used. It may take a day or more for the iodine to combine as the reaction is slow. The test made is to place a few drops of the reacting material into distilled water containing starch solution. If a deep blue color forms immediately uncombined iodine is present, requiring longer heating and agitation. The final product is a dark reddish oil, when observed in a thin film, and otherwise has a black appearance. It contains approximately 5% of sulfur and 43% of iodine and is somewhat more viscous than the sulfurized oleic acid from which it is made. It is soluble in the same solvents in which oleic acid is soluble.

EXAMPLE 2

*9,10-chloroiodothiirane octadecanoic acid*

This compound, having the formula

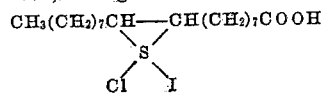

is prepared by passing dry chlorine gas through anhydrous sulfurized oleic acid containing the required amount of finely ground iodine to form the above compound. One atomic weight of iodine is used to each molecular weight of sulfurized oleic acid. Considerable heat is evolved and cooling may be necessary to keep the temperature from exceeding 75° C. Agitation is continued throughout the entire process. The chlorine is passed through the reaction mixture until one atomic weight of chlorine has chemically combined with each molecular weight of the acid. The amount of chlorine added can be determined by weighing the sulfurized oleic acid and iodine before and after chlorination. The final product is a dark red oil which is more viscous than the parent sulfurized oleic acid, contains approximately 6% of sulfur, 7% of chlorine, and 25% of iodine, and has the same solubility in solvents as the parent sulfurized oleic acid.

EXAMPLE 3

*12 - hydroxy - 9,10 - tetrachlorothiirane octadecanoic acid*

This compound, having the formula

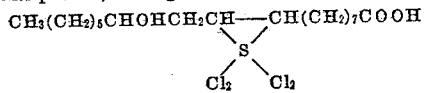

is prepared by passing dry chlorine gas through anhydrous sulfurized ricinoleic acid (12-hydroxy-9,10-thiiraneoctadecanoic acid) with suitable agitation, until four atomic weights of chlorine have been added to each molecular weight of the sulfurized acid. The temperature should not be allowed to go much over 50° C. as considerable heat is evolved. A reddish yellow colored oil is obtained containing approximately 30% of chlorine and 6% of sulfur. It is soluble in carbon tetrachloride, chloroform, most hydrocarbons, and vegetable and animal oils.

EXAMPLE 4

*9,10-tetrabromothiirane hexadecanoic acid*

This compound, having the formula

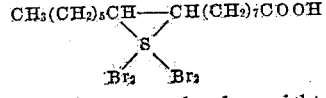

is prepared by treating one molecular weight of anhydrous sulfurized palmitoleic acid (9,10-thiirane hexadecanoic acid) with four atomic weights of bromine. The bromine is dissolved in carbon tetrachloride or some other solvent and added slowly to the sulfurized acid with suitable agitation. The temperature is kept under 50° C. as heat is evolved during the reaction. When the bromine has chemically combined with the sulfur in the sulfurized acid, the solvent is removed by warming the reactants under reduced pressure to remove all of the solvent. A heavy, viscous reddish-yellow oil is obtained containing approximately 50% of bromine and 5% of sulfur.

EXAMPLE 5

*9,10-dichlorothiirane-12-octadecanoic acid*

This compound, having the formula

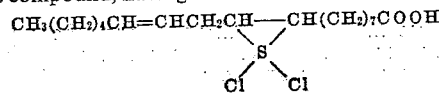

is prepared by passing two atomic weights of dry chlorine gas through one molecular weight of monosulfurized linoleic acid (9,10-thiirane-12-octadecanoic acid) with suitable agitation, keeping the temperature below 50° C. as considerable heat is evolved. The mono sulfurized linoleic acid is prepared by sulfurizing the double bond in the 9 position of linoleic acid. The double bond in the 9 position is the first to add sulfur when heated with sulfur under suitable conditions, as it is the more reactive double bond. A reddish-yellow colored oil is obtained containing approximately 8% of sulfur and 18% of chlorine. It is more viscous than the sulfurized linoleic acid but has approximately the same solubility in solvents.

EXAMPLE 6

9,10-12,13-di(diiodothiirane) octadecanoic acid

This compound, having the formula

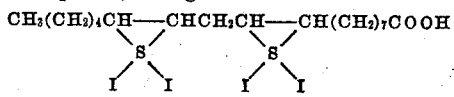

is prepared by heating four atomic weights of iodine with one molecular weight of sulfurized linoleic acid (9,10-12,13-dithiirane octadecanoic acid) in which both double bonds have been saturated with sulfur, at a temperature ranging from 50° to 100° C. until the iodine has combined with the sulfurized acid. The reactants should be thoroughly agitated. A very viscous, black-looking oil is obtained which is soluble in most organic solvents and which contains approximately 7% of sulfur and 56% of iodine.

EXAMPLE 7

Isopropyl 9,10-diiodothiirane octadecanoate

This compound, having the formula

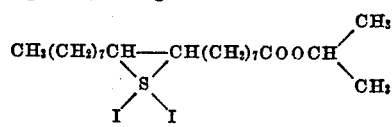

is prepared by adding finely divided iodine to the anhydrous isopropyl ester of sulfurized oleic acid (isopropyl 9,10-thiirane octadecanoate), prepared in the usual manner from anhydrous isopropyl alcohol and anhydrous sulfurized oleic acid, in the proportion of two atomic weights of iodine to one molecular weight of the ester. The reactants are maintained at a temperature of 50° to 100° C. with suitable agitation until the iodine has chemically combined. A product is obtained containing approximately 5% of sulfur and 39% of iodine. It is a very dark reddish colored oil, somewhat more viscous than the parent ester and is insoluble in water but soluble in most organic solvents.

EXAMPLE 8

Ethyl 9,10-dichlorothiirane octadecanoate

This compound, having the formula

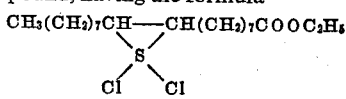

is prepared by passing two atomic weights or dry chlorine gas through one molecular weight of the anhydrous ethyl ester of sulfurized oleic acid (ethyl 9,10-thiirane octadecanoate), prepared from anhydrous ethyl alcohol and sulfurized oleic acid in the usual manner, keeping the temperature below 50° C. with suitable agitation. A product is obtained containing approximately 7% of sulfur and 16% of chlorine. It is a reddish straw colored product, insoluble in water but soluble in most organic solvents. It is somewhat more viscous than the parent ester.

EXAMPLE 9

Butyl 9,10-tetrachlorothiirane octadecanoate

This compound, having the formula

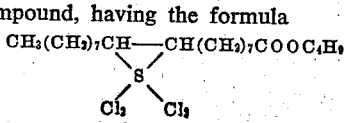

is prepared by passing dry chlorine gas through the anhydrous butyl ester of sulfurized oleic acid (butyl 9,10-thiirane octadecanoate), prepared from butyl alcohol and sulfurized oleic acid in the usual manner. Four atomic weights of chlorine are required to saturate one molecular weight of the ester. The temperature is maintained below 50° C. as considerable heat is evolved during the chlorination. The resulting compound is a dark-reddish straw-colored oil containing approximately 6% of sulfur and 27% of chlorine. It is more viscous than the parent ester and is insoluble in water but soluble in most organic solvents.

EXAMPLE 10

Isopropyl 9,10-tetrabromothiirane hexadecanoate

This compound, having the formula

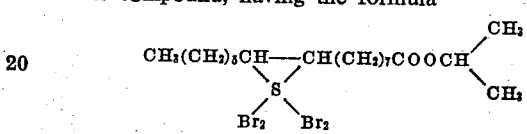

is prepared by adding four atomic weights of bromine, dissolved in carbon tetrachloride or some other solvent to one molecular weight of the isopropyl ester of sulfurized palmitoleic acid (isopropyl 9,10-thiirane hexadecanoate), prepared by reacting anhydrous isopropyl alcohol with anhydrous sulfurized palmitoleic acid in the usual manner, with suitable agitation, keeping the temperature below 50° C. When the reaction is complete the solvent is removed by warming under reduced pressure. A reddish-brown oil is obtained containing approximately 4.5% of sulfur and 48% of bromine. It is insoluble in water but soluble in organic solvents such as chloroform, carbon tetrachloride, most hydrocarbons, and vegetable and animal oils.

EXAMPLE 11

Ethylene glycol monoester of 9,10-diiodothiirane octadecanoic acid

This compound, having the formula

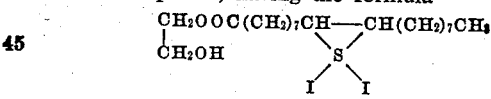

is prepared by adding two atomic weights of iodine to one molecular weight of the ethylene glycol monoester of sulfurized oleic acid, kept at a temperature ranging from 50° to 100° C. with suitable agitation until the iodine has chemically combined with the sulfur in the sulfurized double bond of the oleic acid radical. A very dark reddish colored oil is obtained containing approximately 5% of sulfur and 40% of iodine. It is more viscous than the parent ester and is insoluble in water, but soluble in most organic solvents.

EXAMPLE 12

Propylene glycol diester of 9,10-dichlorothiirane hexadecanoic acid

This compound, having the formula

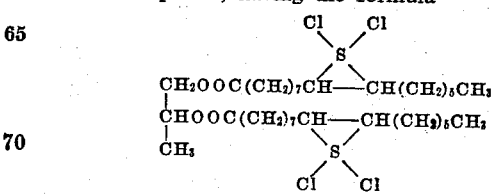

is prepared by adding four atomic weights of chlorine to one molecular weight of propylene glycol diester of sulfurized palmitoleic acid at a temperature below 50° C. as considerable heat is evolved during the reaction. The propylene glycol diester of sulfurized palmitoleic acid is prepared from propylene glycol and sulfurized palmitoleic acid in the usual manner. Two atoms of chlorine add to each sulfurized palmitoleic acid radical of the ester as the di-chlorothiirane compound is more easily formed than the tetra-chlorothiirane compound. The ester is kept well agitated so that a homogenous product may be obtained. A dark reddish yellow oil is obtained which is rather viscous and contains approximately 18% of chlorine and 8% of sulfur. It is soluble in animal and vegetable oils, carbon tetrachloride, chloroform, and other solvents.

EXAMPLE 13

*Proplyene glycol monoester of 12-hydroxy-9,10-diiodothiirane octadecanoic acid*

This compound, having the formula

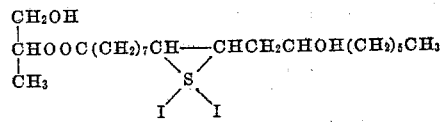

is prepared by adding two atomic weights of iodine to one molecular weight of propylene glycol monoester of sulfurized ricinoleic acid (12-hydroxy-9,10-thiirane octadecanoic acid), prepared from propylene glycol and sulfurized ricinoleic acid in the usual way, and maintaining the resulting reaction mixture at a temperature ranging from 50° to 100° C. with suitable agitation until the iodine has chemically combined with the ester. A dark reddish yellow, viscous oil is obtained containing approximately 5.5% of sulfur and 45% of iodine. It is soluble in most organic solvents.

EXAMPLE 14

*Diethylene glycol monoester of 9,10-dibromothiirane-12,13-thiirane octadecanoic acid*

This compound, having the formula

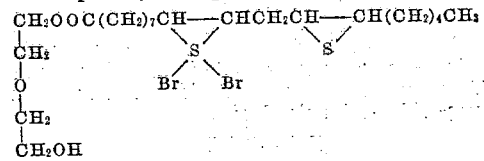

is prepared by reacting two atomic weights of bromine dissolved in chloroform, with the diethylene glycol monoester of sulfurized linoleic acid in which both double bonds have been saturated with sulfur, at a temperature of about 50° C. The sulfur in the thiirane radical in the 9,10 position of the sulfurized linoleic acid radical is more reactive than the thiirane radical in the 12,13 position. A very dark reddish oil is obtained which is more viscous than the parent ester and contains approximately 25% bromine and 10% of sulfur. It is soluble in alcohol, acetone and vegetable and animal oils.

The amount of sulfur that will chemically combine with a vegetable or animal oil will depend upon the unsaturation of the oil as shown by the iodine number. The approximate per cent of combining sulfur may be determined by dividing the iodine number by ten. For every atomic weight of combined sulfur in the oil, two atomic weights of the halogen will combine with the sulfur, producing the sulfur-halogen compounds. Examples 15, 16 and 17 illustrate the halogenation of sulfurized fatty acid glycerides.

EXAMPLE 15

*Iodized sulfurized-castor oil*

This product is prepared by adding finely divided iodine to sulfurized castor oil kept at a temperature below 100° C. with agitation, until the iodine has chemically combined. U. S. P. castor oil has an iodine number ranging from 83 to 88, hence, approximately 8% of sulfur can be added to castor oil and the sulfur-iodine product will contain approximately 31% of iodine. The reaction is slow requiring considerable time for completion. A dark reddish brown viscous oil is obtained. It is soluble in acetone, glycerine, chloroform, carbon tetrachloride, and is partially soluble in alcohol.

EXAMPLE 16

*Chlorinated sulfurized-olive oil*

U. S. P. olive oil has an iodine number ranging from 79 to 88, hence, a sulfurized olive oil will contain approximately 7% of combined sulfur. The chloro-sulfur preparation is prepared by passing dry chlorine gas through anhydrous sulfurized olive oil at a temperature about 50° C. until no more chlorine will be taken up. Agitation is maintained throughout the entire process. A sulfurized olive oil containing 7% of combined sulfur was made to combine with 21% of chlorine. The product is a viscous reddish brown oil insoluble in water, but soluble in chloroform, carbon tetrachloride, and other organic solvents.

EXAMPLE 17

*Chlorinated-iodized sulfurized-neat's-foot oil*

Neat's-foot oil has an iodine number ranging from 44 to 73. An oil with an iodine number of 60 was sulfurized in the usual manner to contain approximately 6% of sulfur. This sulfurized oil, in turn, was treated with one atomic weight of iodine for each atomic weight of sulfur and dry chlorine gas passed through the oil, and maintained below 50° C. until one atomic weight of chlorine had combined with the oil. A product was obtained containing approximately 5% of sulfur, 15% of iodine and 5% of chlorine. It is a dark reddish colored oil which is somewhat more viscous than the sulfurized oil. It is soluble in carbon tetrachloride, chloroform and other organic solvents.

EXAMPLE 18

*Diiodized sulfurized-cholesterol*

This compound is prepared by refluxing one molecular weight of sulfurized cholesterol dissolved in carbon tetrachloride or chloroform with two atomic weights of iodine with suitable agitation until there is no free iodine as shown by test. The solvent is removed by warming under reduced pressure. A very dark reddish colored solid is obtained containing 37% of iodine and 4.5% of sulfur. It is soluble in chloroform, animal and vegetable oils, and most hydrocarbons.

EXAMPLE 19

*Tetrachlorinated sulfurized-stigmasterol*

This compound is prepared by passing dry chlorine gas into anhydrous sulfurized stigmasterol dissolved in carbon tetrachloride, with suitable agitation, until four atomic weights of chlorine have combined with one molecular weight of sulfurized stigmasterol. The temperature should not be over 50° C. When the reaction is complete the solvent is removed by warming under reduced pressure. A dark reddish yellow solid is obtained containing approximately 22% of chlorine and 10% of sulfur. It is soluble in chloroform, carbon tetrachloride, vegetable and animal oils, and most hydrocarbons.

EXAMPLE 20

*Dibrominated monosulfurized-ergosterol*

This compound is prepared by adding two atomic weights of bromine dissolved in chloroform to a solution of one molecular weight of monosulfurized ergosterol dissolved in chloroform. The reactants are warmed to about 50° C. with suitable agitation. When the bromine has combined, the solvent is removed by warming under reduced pressure. A dark reddish yellow solid is obtained containing approximately 27% of bromine and 5% of sulfur. It is soluble in carbon tetrachloride, chloroform, vegetable and animal oils, and in most hydrocarbons.

EXAMPLE 21

*Diiodized ester of sulfurized cholesterol and 9,10-thiirane octadecanoic acid*

This compound is prepared by reacting one molecular weight of the ester of sulfurized cholesterol and 9,10-thiirane octadecanoic acid (prepared from sulfurized cholesterol and sulfurized oleic acid in the usual way by reaction at 130° to 150° C.) with two atomic weights of iodine dissolved in a solvent such as chloroform with suitable agitation. The solution of the ester and iodine are refluxed until the iodine has chemically combined. Since the sulfur in the acid radical of the ester is more reactive to halogens than that in the alcohol radical, the two iodine atoms add to the sulfur in the acid radical, none adding to the sulfur in the cholesterol. The solvent is removed by warming under reduced pressure to obtain a very dark reddish colored solid containing approximately 6% of sulfur and 26% of iodine. It is soluble in chloroform, carbon tetrachloride, vegetable and animal oils.

EXAMPLE 22

*Dichlorinated ester of sulfurized cholesterol and salicylic acid*

This compound is prepared by reacting the sulfurized cholesterol ester of salicylic acid (prepared by esterifying salicylic acid with sulfurized cholesterol), dissolved in chloroform or some other solvent, and dry chlorine gas. The chlorine gas is passed through the solution maintained at about 50° C. using a reflux condenser to prevent the loss of solvent. When two atomic weights of chlorine have been added to one molecular weight of the ester, the solvent is removed by warming under reduced pressure. The product is a reddish yellow colored solid containing approximately 11% of chlorine and 5% of sulfur. It is soluble in chloroform, carbon tetrachloride, and chlorinated hydrocarbons.

EXAMPLE 23

*Tetrabrominated ester of disulfurized lanosterol and sulfurized palmitoleic acid*

This compound is prepared by adding four atomic weights of bromine to one molecular weight of the ester of disulfurized lanosterol and sulfurized palmitoleic acid (9,10-thiirane hexadecanoic acid) dissolved in chloroform, and the mixture maintained at about 50° C. with suitable agitation until the bromine has chemically combined. The solvent is removed by warming under reduced pressure. A reddish yellow solid is obtained containing approximately 8.5% of sulfur and 29% of bromine. It is soluble in chloroform, carbon tetrachloride, and vegetable and animal oils on warming. Of the four bromine atoms taken up, two of these link to the sulfur of the thiirane group of the side chain of the lanosterol while the other two atoms add to the sulfur of the thiirane group of the palmitoleic acid.

Due to the fact that it is very difficult to get the various acids, esters, glycol esters, sterols, and sterols esters in a pure form, the percentage of sulfur and halogen that the various compounds will contain will depend upon their purity. When commercial products are used in the manufacture of the various compounds, other impurities will be mixed with the new compounds lowering the sulfur and halogen contents.

I claim:

1. An organic compound selected from the group consisting of an aliphatic monocarboxylic higher fatty acid, an ester of an aliphatic monocarboxylic higher fatty acid and a lower alkanol, a glyceride, a sterol, a sterol ester of an aliphatic monocarboxylic higher fatty acid, and a glycol ester of an aliphatic monocarboxylic higher fatty acid and containing a thiirane group of the formula

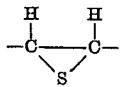

said compound having only halogen linked to the sulfur of the said thiirane group.

2. An aliphatic monocarboxylic higher fatty acid containing a thiirane group of the formula

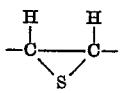

said acid having only halogen linked to the sulfur of said thiirane group.

3. An ester of an aliphatic monocarboxylic higher fatty acid and a lower alkanol containing a thiirane group of the formula

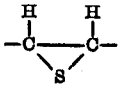

said ester having only halogen linked to the sulfur of said thiirane group.

4. A sterol containing a thiirane group of the formula

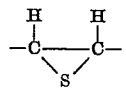

said sterol having only halogen linked to the sulfur of said thiirane group.

5. A sterol ester of an alpihatic monocarboxylic higher fatty acid containing a thiirane group of the formula

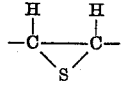

said sterol ester having only halogen linked to the sulfur of said thiirane group.

6. A glycol ester of an aliphatic monocarboxylic higher fatty acid containing a thiirane group of the formula

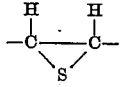

said glycol ester having only halogen linked to the sulfur of said thiirane group.

7. A process comprising heating stoichiometrical proportions of an organic compound selected from the group consisting of an aliphatic monocarboxylic higher fatty acid, an ester of an aliphatic monocarboxylic higher fatty acid and a lower alkanol, a glyceride, a sterol, a sterol ester of an aliphatic monocarboxylic higher fatty acid, and a glycol ester of an aliphatic monocarboxylic higher fatty acid and containing a thiirane group of the formula

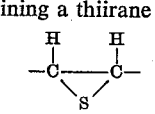

and a material consisting of halogen at a temperature ranging from about room temperature to 100° C. whereby linkage of halogen to the sulphur of said thiirane group is the only reaction which occurs.

8. The process of claim 7 wherein the organic compound is an aliphatic monocarboxylic higher fatty acid.

9. The process of claim 7 wherein the organic compound is an ester of an aliphatic monocarboxylic higher fatty acid and a lower alkanol.

10. The process of claim 7 wherein the organic compound is a sterol.

11. The process of claim 7 wherein the organic compound is a sterol ester of an aliphatic monocarboxylic higher fatty acid.

12. The process of claim 7 wherein the organic compound is a glycol ester of an aliphatic monocarboxylic higher fatty acid.

References Cited in the file of this patent

UNITED STATES PATENTS

| Number | Name | Date |
|---|---|---|
| 696,900 | Degner | Apr. 1, 1902 |
| 2,259,695 | Hull | Oct. 21, 1941 |
| 2,360,905 | Smith | Oct 24, 1944 |
| 2,427,717 | Dearborn | Sept. 23, 1947 |

OTHER REFERENCES

Schonberg: Ber. 64B, pp. 1390–99 (1931).

Culvenor et al.: Jour. Chem. Soc., London, 1949, pp. 282–287.